United States Patent
Dibirdi et al.

(10) Patent No.: US 8,891,384 B2
(45) Date of Patent: Nov. 18, 2014

(54) CIRCUIT EMULATION SERVICE FOR CARRYING TIME DIVISION MULTIPLEXED SCADA TRAFFIC

(71) Applicants: Alp Dibirdi, Andover, MA (US); Daniel Lafleur, Kanata (CA)

(72) Inventors: Alp Dibirdi, Andover, MA (US); Daniel Lafleur, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 136 days.

(21) Appl. No.: 13/658,373

(22) Filed: Oct. 23, 2012

(65) Prior Publication Data
US 2014/0112159 A1    Apr. 24, 2014

(51) Int. Cl.
*H04J 3/12* (2006.01)
*H04Q 11/04* (2006.01)
*H04L 12/46* (2006.01)
*H04W 28/06* (2009.01)
*H04L 12/66* (2006.01)
*H04L 29/06* (2006.01)

(52) U.S. Cl.
CPC *H04J 3/12* (2013.01); *H04Q 11/04* (2013.01); *H04W 28/06* (2013.01); *H04L 12/4633* (2013.01); *H04L 12/66* (2013.01); *H04L 69/08* (2013.01)
USPC ........... 370/250; 370/345; 370/352; 370/356; 370/401; 370/458; 370/466; 370/474

(58) Field of Classification Search
CPC .................................................. H04J 3/0632
See application file for complete search history.

(56) References Cited

U.S. PATENT DOCUMENTS

| | | | |
|---|---|---|---|
| 6,577,620 B1 * | 6/2003 | Galyas et al. | 370/352 |
| 6,870,837 B2 * | 3/2005 | Ho et al. | 370/356 |
| 6,963,561 B1 * | 11/2005 | Lahat | 370/356 |
| 7,289,538 B1 * | 10/2007 | Paradise et al. | 370/497 |
| 7,483,440 B2 * | 1/2009 | Choudhury et al. | 370/409 |
| 7,613,212 B1 * | 11/2009 | Raz et al. | 370/510 |
| 7,660,330 B1 * | 2/2010 | Shmilovici | 370/503 |
| 8,532,137 B1 * | 9/2013 | Afferton et al. | 370/466 |

(Continued)

FOREIGN PATENT DOCUMENTS

| | | |
|---|---|---|
| EP | 2 068 471 A1 | 6/2009 |
| EP | 2 434 717 A1 | 3/2012 |

OTHER PUBLICATIONS

Notification of Transmittal of the International Search Report and the Written Opinion of the International Searching Authority, or the Declaration, in PCT/US2013/065022 mailed Jan. 7, 2014.

(Continued)

*Primary Examiner* — Bunjob Jaroenchonwanit
(74) *Attorney, Agent, or Firm* — Kramer Amado, P.C.

(57) ABSTRACT

Embodiments of the invention employ specially adapted P2MP and MP2P transmission techniques to communicate traffic of a TDM based SCADA system over an IP/MPLS based network. Advantageously, by specially adapting P2MP and MP2P transmission techniques to carry TDM based SCADA traffic over an IP/MPLS network, an existing TDM based SCADA system can be migrated to an IP/MPLS network and operated in an easy to manage and bandwidth efficient manner as compared to a solution that employs point-to-point connections between a SCADA master node and subsystems over an IP/MPLS network. Furthermore, since TDM based SCADA equipment would not need to be replaced with IP based SCADA equipment in such a migration, significant equipment and installation costs associated with such replacement can be avoided.

12 Claims, 5 Drawing Sheets

(56) References Cited

U.S. PATENT DOCUMENTS

| | | | |
|---|---|---|---|
| 2002/0122414 A1* | 9/2002 | Gorhammar et al. | 370/351 |
| 2002/0131429 A1* | 9/2002 | Scott et al. | 370/401 |
| 2004/0028051 A1* | 2/2004 | Etemadi et al. | 370/395.1 |
| 2004/0047367 A1* | 3/2004 | Mammen | 370/472 |
| 2004/0190548 A1* | 9/2004 | Harel et al. | 370/466 |
| 2005/0083833 A1* | 4/2005 | Gettala et al. | 370/219 |
| 2005/0100054 A1* | 5/2005 | Scott et al. | 370/503 |
| 2007/0071029 A1* | 3/2007 | White et al. | 370/466 |
| 2008/0304476 A1* | 12/2008 | Pirbhai et al. | 370/356 |
| 2009/0190610 A1* | 7/2009 | Pirbhai et al. | 370/466 |
| 2010/0172357 A1* | 7/2010 | Poulin et al. | 370/395.4 |
| 2010/0315941 A1* | 12/2010 | Rorai et al. | 370/216 |
| 2012/0099659 A1* | 4/2012 | Lin et al. | 375/240.26 |
| 2012/0269189 A1* | 10/2012 | Yang et al. | 370/353 |
| 2013/0003759 A1* | 1/2013 | Sergeev et al. | 370/498 |

OTHER PUBLICATIONS

Stein et al., "Time Division Multiplexing Over IP (TDMoIP)", RFC: 5087, Dec. 2007, pp. 1-50.

\* cited by examiner

US 8,891,384 B2

CIRCUIT EMULATION SERVICE FOR CARRYING TIME DIVISION MULTIPLEXED SCADA TRAFFIC

FIELD OF THE INVENTION

The invention is directed to communication networks, particularly to systems and methods for carrying time division multiplexed (TDM) traffic over a packet switched network (PSN) to and from multiple destinations simultaneously.

BACKGROUND OF THE INVENTION

Supervisory Control and Data Acquisition (SCADA) systems have been in operation for many years now and they are widely used for monitoring and/or controlling various remote subsystems. For example, SCADA based solutions are deployed in various power grids, gas pipelines, and railway systems throughout the globe today. Through the use of SCADA systems operators can read data, such as actual resource usage or flow, from individual subsystems and/or can control the subsystem, for example to open or shut a gas pipeline. A communication network is therefore required between the remote SCADA subsystems and the main node, which is also referred to herein as a master node. Legacy, time division based communication networks are already in place to provide the required connectivity between the master node and the subsystems. However, many of these networks are slowly reaching their useful life and many vendors of the equipment used in these networks are terminating support for their legacy equipment. Operating such aging gear is also becoming difficult as equipment vendors are not manufacturing such legacy equipment anymore.

Another issue is the requirement to introduce new services like Voice over Internet Protocol (VoIP), video surveillance, and so on into SCADA systems. Given the age of the legacy networks providing connectivity in many SCADA solutions, the network nodes typically do not have the capacity for additional bandwidth demanding applications. Migrating to a modern Internet Protocol (IP)/Multi-protocol Label Switching (MPLS) based solution while preserving investments made in existing TDM-based non-IP SCADA equipment is a key challenge. SCADA systems typically make use of a point-to-multipoint (P2MP) and multipoint-to-point (MP2P) transmission provided via multi-drop data bridge/bus (MDDB) configurations. While such transmission can be provided for asynchronous traffic by existing IP/MPLS capabilities, providing such transmission for TDM traffic over IP/MPLS is currently undefined. At present, carrying TDM traffic over an IP/MPLS network operates solely in a point-to-point manner. However, for SCADA systems with dozens or even hundreds of subsystems providing such point-to-point connections over an IP/MPLS network becomes cumbersome to manage and an inefficient use of network bandwidth and other resources.

One way to modernize a SCADA system is to invest in new IP capable SCADA equipment. That is, to replace each SCADA subsystem and associated master node with a new IP based SCADA subsystem and IP based master node. However, to do so can be a very costly, time consuming and service interrupting process.

In view of the foregoing it appears that an easy to manage and bandwidth efficient way to communicate traffic of a TDM based non-IP SCADA system over an IP/MPLS based infrastructure would be desirable.

SUMMARY

Embodiments of the invention employ specially adapted P2MP and MP2P transmission techniques to communicate traffic of a TDM based SCADA system over an IP/MPLS based network.

According to an aspect of the invention a method is provided of communicating SCADA traffic between TDM based SCADA equipment over a PSN performed at a PE node. The method includes the steps of: determining if a TDM SCADA message has been received over a serial link, if a TDM SCADA message has been received encapsulating the TDM SCADA message in a CES packet and if a TDM SCADA message has not been received generating a filler frame and encapsulating the filler frame in a CES packet; setting a serial number of the CES packet to null; and transmitting the CES packet over the PSN.

According to another aspect of the invention a network node is provided. The network node comprises: a serial interface for coupling to a serial link to communicate TDM traffic; a packet interface for coupling to a packet switched network to communicate packet traffic; a processor coupled to the serial and packet interfaces; a memory coupled to the processor; a program of computer readable instructions stored in the memory that when executed by the processor cause the network node to perform a method of communicating SCADA traffic between TDM based SCADA equipment over a PSN. The method comprises: determining if a TDM SCADA message has been received over a serial link, if a TDM SCADA message has been received encapsulating the TDM SCADA message in a CES packet and if a TDM SCADA message has not been received generating a filler frame and encapsulating the filler frame in a CES packet; setting a serial number of the CES packet to null; and transmitting the CES packet over the PSN.

According to yet another aspect of the invention a network node is provided that comprises: a serial link interface; a packet interface; and a CES function adapted to be operable to encapsulate in a CES packet a TDM SCADA message received over the serial link interface, to set a serial number of the packet to null, and to transmit the CES packet over the packet interface.

Advantageously, by specially adapting P2MP and MP2P transmission techniques to carry TDM based SCADA traffic over an IP/MPLS network, an existing TDM based SCADA system can be migrated to an IP/MPLS network and operated in an easy to manage and bandwidth efficient manner as compared to a solution that employs point-to-point connections between a SCADA master node and subsystems over an IP/MPLS network. Furthermore, since TDM based SCADA equipment would not need to be replaced with IP based SCADA equipment in such a migration, significant equipment and installation costs associated with such replacement can be avoided.

BRIEF DESCRIPTION OF THE DRAWINGS

The foregoing and other objects, features and advantages of the invention will be apparent from the following more particular description of the preferred embodiments, as illustrated in the appended drawings, where.

In the figures like features are denoted by like reference characters.

DETAILED DESCRIPTION

Figure 1:
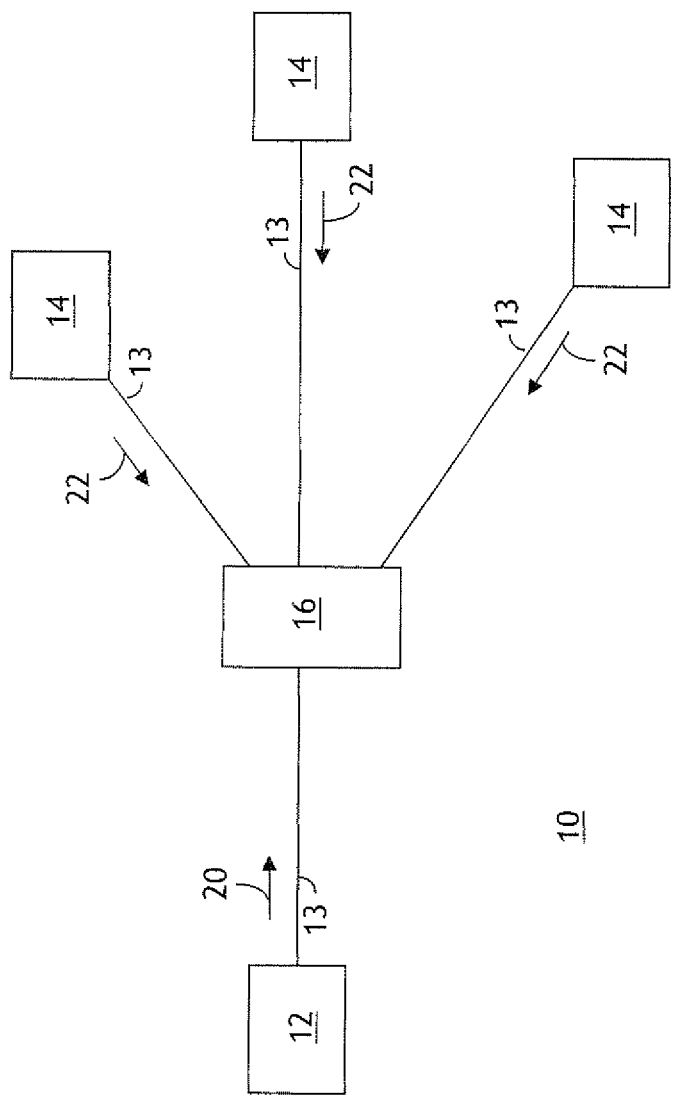
FIG. 1 depicts a prior art SCADA system.

FIG. 1 depicts a prior art SCADA system 10. The SCADA system 10 includes a master node 12 communicatively coupled to a MDDB 16 via a serial link 13. The SCADA system 10 also includes three SCADA subsystems 14, each of which are connected to the MDDB 16 by a respective serial link 13. In operation, the master node 12 sends control messages 20 to the subsystems 14 via the MDDB 16 and serial links 13. Each subsystem 14 in turn replies with a data message 22 when requested to do so by a control message 20 addressed to it. The data message 22 may alternatively or additionally include a status indication of the subsystem 14 or other information. The control messages 20 and data messages 22 are also referred to herein as traffic of a SCADA system or SCADA traffic.

The MDDB 16 typically provides a bridge or bus function whereby the master node 12 broadcasts the control messages 20 to the subsystems 14, and by which the subsystems 14 communicate their respective data messages 22 over a shared connection to the master node 12.

Figure 2:
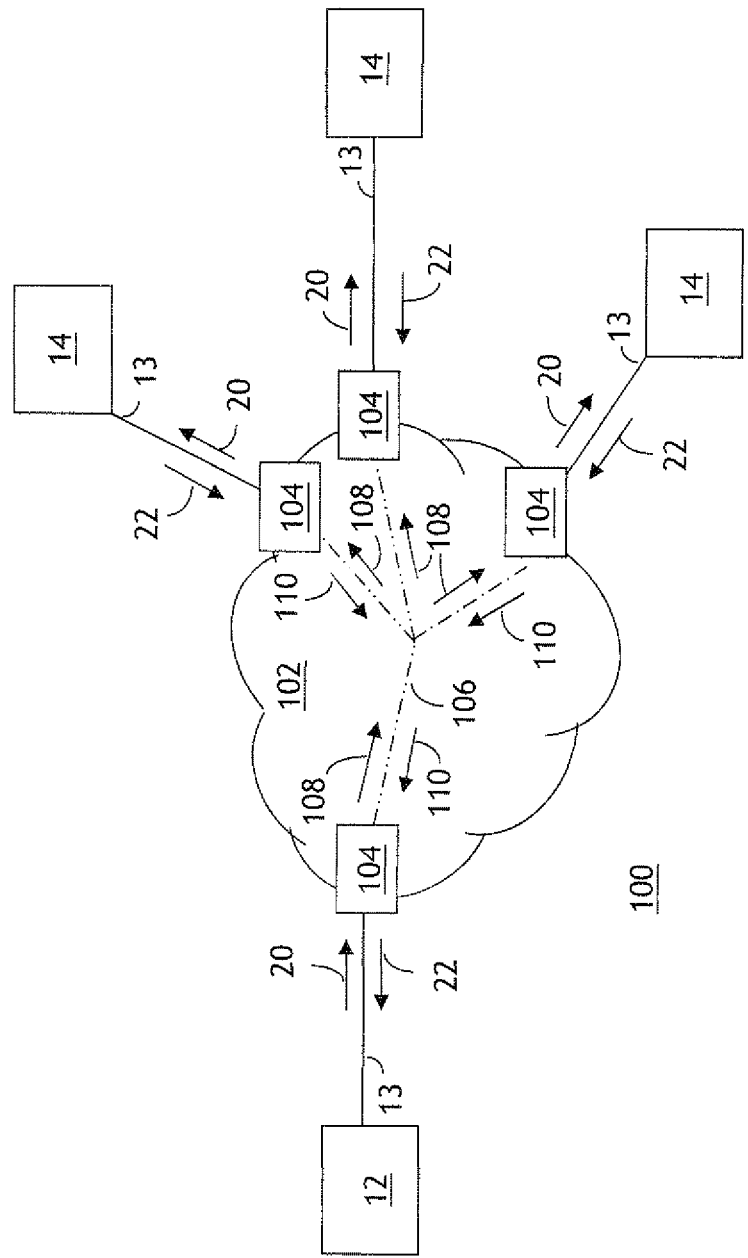
FIG. 2 depicts a SCADA system according to a first embodiment of the invention.

FIG. 2 depicts a SCADA system 100 according to a first embodiment of the invention. The master node 12 and SCADA subsystems 14 are each connected via a respective serial link 13 to a packet switched network (PSN) 102, which by way of non-limiting example could be an Ethernet network (i.e. p2p, bridged, etc), an IP network, or an IP/MPLS network which would be agnostic to underlying Layer-II infrastructure (i.e. Layer-2 NW can be Packet over SONET/SDH, PPP, etc). The PSN 102 includes at its edge a respective provider edge (PE) node 104 coupled to each of the serial links 13. The PSN 102 communicatively couples the PE nodes 104 via a bidirectional routed connection 106 that takes the form of a point-to-multipoint (P2MP) connection to communicate control messages 20 from the master node 12 to the SCADA subsystem nodes 14, and a multi-to-point (MP2P) connection to communicate data messages 22 from the SCADA subsystems 14 to the master node 12. In this way, operation of the PSN 102, the PE nodes 104, and the bidirectional routed connection 106 emulate the functionality of the MDDB 16.

Among other functions, each PE node 104 forms one or more packets, which are referred to hereinafter for convenience as control packets 108, from a control message 20 that it receives over one of the serial links 13, and then transmits the control packet(s) 108 into the PSN 102 for transport to other PE nodes 104 over the bidirectional routed connection 106. Similarly each PE node 104 forms one or more packets, which are referred to hereinafter for convenience as data packets 110, from a data message 22 that it receives over one of the serial links 13 and then transmits the data packet(s) 110 into the PSN 102 for transport to other PE nodes 104 over the bidirectional routed connection 106. Such packet formation includes encapsulating bits of a control or data message 20, 22 into a packet payload by adding thereto an appropriate header according to the technology of the PSN 102, e.g. Ethernet, IP, IP/MPLS, etc. Conversely, each PE node 104 forms a corresponding control or data message 20, 22 from bits received in the payload of one or more control or data packets 108, 110 that it receives from other PE nodes 104 over the bidirectional routed connection. The PE node 104 then serially transmits the control or data message 20, 22 so formed over one of the serial links 13 to the master node 12 in the case of control messages 20 and to the SCADA subsystems 14 in the case of data/status messages 22.

Figure 3:
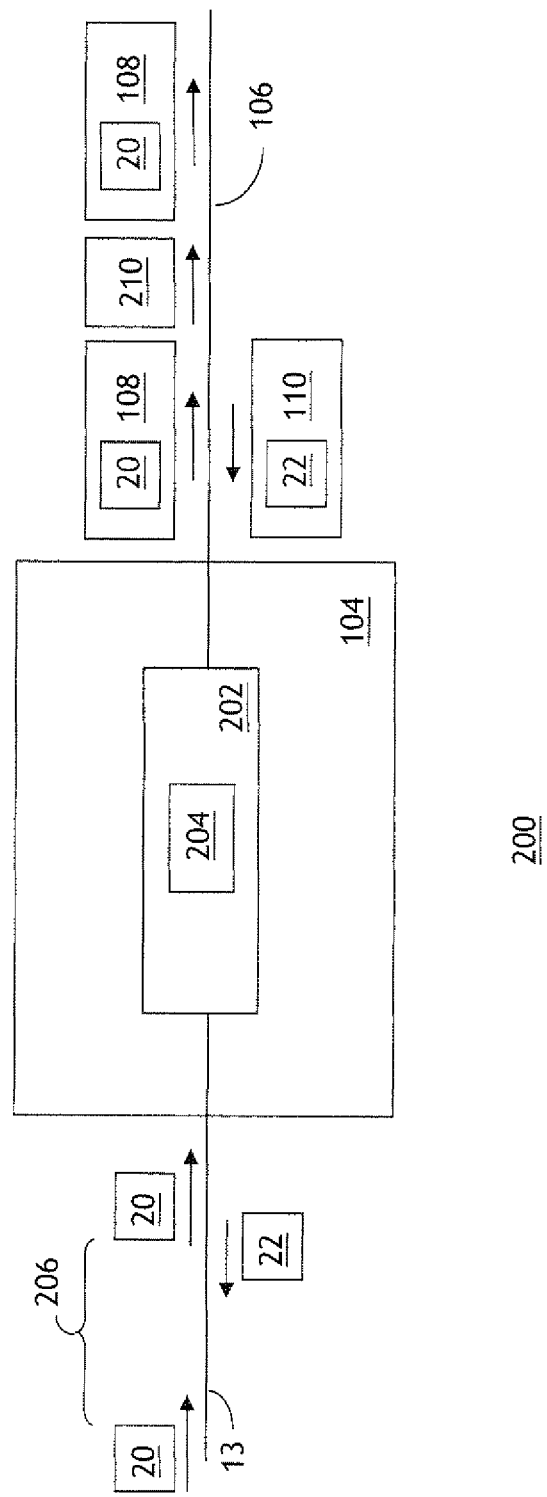
FIG. 3 is a functional block diagram of a provider edge (PE) node of FIG. 2 according to a second embodiment of the invention.

FIG. 3 is a functional block diagram 200 of the PE node 104 in FIG. 2 according to a second embodiment of the invention. The figure also shows the PE node 104 in operation performing certain steps of a method of communicating SCADA traffic between non-IP SCADA equipment over a IP/MPLS network according to a third embodiment of the invention.

The PE node 104 includes a Circuit Emulation Service (CES) function 202 that has been adapted for application in a SCADA system. Specifically, the CES function 202 has been adapted so that CES can be used in a point-to-multipoint and multipoint-to-point manner to carry traffic from non-IP SCADA equipment over an IP/MPLS network infrastructure. To do so, the SCADA traffic is treated like a bit stream. This avoids needing to augment IP/MPLS nodes in the PSN 102 with capabilities to handle non-IP/MPLS protocols used in TDM based SCADA networks. In operation, traffic (e.g. control message 20) received from the SCADA master node 12 is interworked into a specially adapted CES packet (e.g. control packet 108). Likewise, traffic (e.g. data message 22) received from any of the SCADA subsystems 14 is interworked into a specially adapted CES packet (e.g. data packet 110).

CES known in the prior art is designed to keep track of sequence numbers in both directions. However, given the nature of point-to-multipoint delivery where only the intended SCADA subsystem 14 is to process a control message 20 address to it, the CES function 202 has been adapted to have sequence number tracking disabled. Disabling the sequence number tracking allows the SCADA subsystems 14 to transmit and receive asynchronously over an IP/MPLS network via the specially adapted Circuit Emulation Service. Without the sequence numbers, a SCADA master issued frame (e.g. the control message 20) is delivered to all subsystems 14 and only the subsystem designated as the destination at SCADA layer ends up processing the control information carried in the message 20. The converse is also true. A subsystem 14 with data to transmit will end up transmitting a data message 22 asynchronously, which could potentially result in multiple subsystems 14 transmitting their messages 22 simultaneously. The master node 12 would end up receiving these messages 22 in any order given that the PE nodes 14 with the adapted CES function 202 do not try to sort the frames, or discard them based on the sequence number tracking function.

It should be noted that the specially adapted CES packets can then be transported directly as Ethernet payload (e.g. per RFC 5087). In that case, CES over Ethernet traffic would then be handed to Ethernet bridging service for multipoint delivery. The specially adapted CES packets can also be interworked to MPLS, User Datagram Protocol (UDP)/IP, etc for delivery over different network types. In the case of UDP/IP, IP multicast can be used for multipoint deliver as an example. The principles described herein for communicating traffic of TDM based SCADA systems still hold irrespective of the encapsulation type.

The PE node 104 also includes an activity detection function 204. With prior art CES functionality each endpoint is expected to transmit continuously. However, in a SCADA system since the subsystems 14 can transmit their data messages 22 asynchronously, a time period 206 of transmission inactivity can appear on the serial link 13 that connects a given SCADA subsystem 14 to a given PE node 104. If a valid bit stream is not received at the PE node 104, the activity detection function 204 detects this occurrence and signals the adapted CES function 202 to generate one or more filler frames 210 for the time period 206. The filler frames 210 are detected and dropped at the receiving PE node 104 so that only messages 20, 22 are exchanged between the master node 12 and the SCADA subsystems 14.

Figure 4:
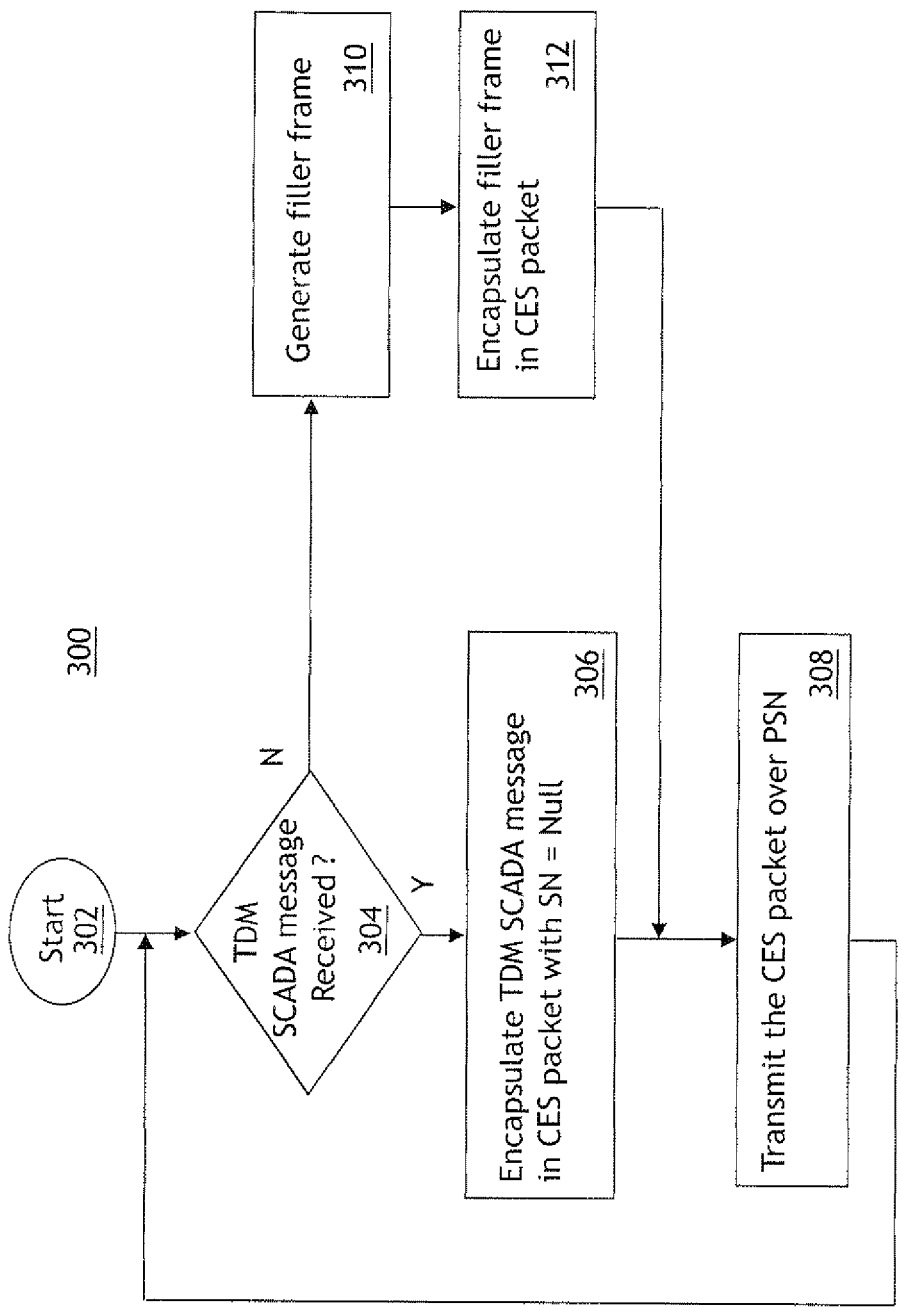
FIG. 4 is a flow chart of a method of communicating SCADA traffic between TDM based SCADA equipment over a PSN network according to a third embodiment of the invention.

FIG. 4 is a flow chart of a method 300 of communicating SCADA traffic between TDM based SCADA equipment over a PSN 102 according to a third embodiment of the invention. After starting 302 the method 300 proceeds to checking 304 if a TDM SCADA message has been received on a serial link 13 by a PSN node that is implementing the method 300, for example one of the PE nodes 104 of FIG. 2. If a TDM SCADA message (e.g. a control or data message 20, 22) has been received, then the method proceeds to encapsulating 306 the TDM SCADA message in a specially adapted CES packet (e.g. a control or data packet 108, 110), the adaptation comprising setting the serial number of the packet to null, blank, zero, omitting it, or other treatment that will have the effect of providing no sequential ordering indication of the CES packets that are communicated over the PSN network. If a TDM SCADA message has not yet been received since the method 300 was started 302 or after expiration of a predetermined time interval (e.g. the time period 206), then the method 300 proceeds by generating 310 a filler frame. The predetermined time interval could be defined in many ways, for example it could be an integer multiple of a timeslot defined by the TDM techniques employed by the SCADA equipment. The method 300 then proceeds to encapsulating 412 the filler frame into a specially adapted CES packet. The method 300 then proceeds to transmitting 308 the specially adapted CES packet over the PSN 102. If the serial link 13 is coupled to a master node 12, the specially adapted CES packet is transmitted over a P2MP routed connection to other PE nodes 104 that have serial links coupled to SCADA subsystems 14 that are to communicate with the master node 12. If the serial link 13 is coupled to one of the SCADA subsystems 14, then the specially adapted CES packet is transmitted over a MP2P routed connection to the PE node 104 that is coupled to the master node 12.

Upon receiving a specially adapted CES packet over the PSN 102, the method 300 includes de-encapsulating the received specially adapted CES packet to obtain the TDM SCADA message carried in the packet's payload, and transmitting the TDM SCADA message over the serial link 13 coupled to the master node 12 in the case where the TDM SCADA message is a data message 22, or the serial link coupled to a respective SCADA subsystem 14 in the case where the TDM SCADA message is a control message 20.

Figure 5:
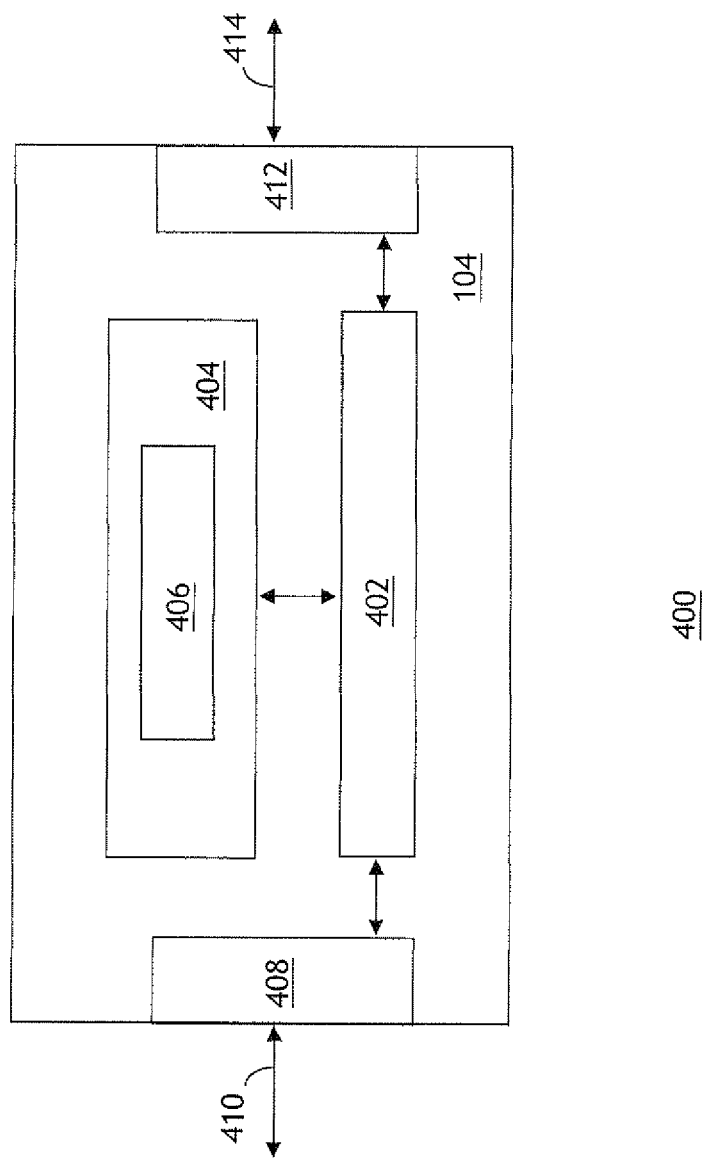
FIG. 5 depicts the architecture of the PE node of FIG. 2 according to a fourth embodiment of the invention.

FIG. 5 depicts the architecture 400 of the PE node 104 of FIG. 2 according to a fourth embodiment of the invention. The PE node 104 includes a processor 402 communicatively coupled to a memory 404 so as to enable the processor 402 to read data from the memory 404 and write data to the memory 404. The data could take the form of program instructions, SCADA traffic messages, and specially adapted CES packets among other things. The memory 404 has a program 406 of computer readable instructions stored therein which when accessed and executed by the processor 402 cause the PE node 104 to perform the method 300 of communicating SCADA traffic between TDM based SCADA equipment over a PSN 102. The PE node 104 also includes a TDM interface 408 for receiving and transmitting TDM traffic 410 such as the TDM SCADA messages previously mentioned, as well as a packet interface 412 for receiving and transmitting packet traffic 414 such as the specially adapted CES packets previously described. The TDM interface 408 and the packet interface 412 are each communicatively coupled to the processor 402 so as to enable the processor 402 to receive traffic or information contained therein from the interfaces 408, 412, and to transmit traffic or information to be contained therein to the interfaces 408, 412. With respect to the foregoing example SCADA system 100 the TDM interface 408 would be connected to one of the serial links 13 and the packet interface 412 would be connected to other nodes in the PSN 102.

Numerous modifications, variations and adaptations may be made to the embodiments of the invention described above without departing from the scope of the invention, which is defined in the claims.

What is claimed is:

1. A method of communicating Supervisory Control and Data Acquisition (SCADA) traffic between time division multiplexed (TDM) based SCADA equipment over a packet switched network (PSN) performed at a provide edge (PE) node, comprising:
   determining whether a message received over a serial link is a TDM SCADA message;
   when the received message is the TDM SCADA message encapsulating the TDM SCADA message in a circuit emulation service (CES) packet and setting a serial number of the CES packet to null;
   when the received message is not the TDM SCADA message: generating a filler frame and encapsulating the filler frame in a CES packet; and
   transmitting the CES packet over the PSN.

2. The method of claim 1, wherein the determining step further comprises:
   determining if the serial link is coupled to a SCADA master node; and the transmitting step further comprises:
   transmitting the CES packet over a point-to-multipoint (P2MP) routed connection responsive to the serial link being coupled to the SCADA master node.

3. The method of claim 1, wherein the determining step further comprises:
   determining whether the serial link is coupled to a SCADA subsystem; and
   the transmitting step further comprises:
   transmitting the CES packet over a multipoint-to-point (MP2P) routed connection responsive to the serial link being coupled to the SCADA subsystem.

4. The method of claim 1, wherein the determining step further comprises:
   determining whether the TDM SCADA message has not yet been received after expiration of a predetermined time interval.

5. The method of claim 4, wherein the predetermined time interval corresponds to a timeslot defined by TDM techniques employed by the SCADA equipment.

6. A network node comprising:
   a serial interface configured for coupling to a serial link to communicate time division multiplexed (TDM) traffic;
   a packet interface configured for coupling to a packet switched network (PSN) to communicate packet traffic;
   a processor coupled to the serial and packet interfaces;
   a memory coupled to the processor;
   a program of computer readable instructions stored in the memory that when executed by the processor cause the network node to:
   determine whether a TDM Supervisory Control and Data Acquisition (SCADA) message has been received over a serial link;

when the received message is the TDM SCADA message encapsulate the TDM SCADA message in a circuit emulation service (CES) packet and set a serial number of the CES packet to null;

when the received message is not the TDM SCADA message: generate a filler frame and encapsulate the filler frame in a CES packet; and transmit the CES packet over the PSN.

7. The network node of claim 6, wherein the program of computer readable instructions stored in the memory that when executed by the processor further cause the network node to:

determine whether the serial link is coupled to a SCADA master node; and transmit the CES packet over a point-to-multipoint (P2MP) routed connection responsive to the serial link being coupled to the SCADA master node.

8. The network node of claim 6, wherein the program of computer readable instructions stored in the memory that when executed by the processor further cause the network node to:

determine whether the serial link is coupled to a SCADA subsystem; and transmit the CES packet over a multipoint-to-point (MP2P) routed connection responsive to the serial link being coupled to the SCADA subsystem.

9. The network node of claim 6, wherein the program of computer readable instructions stored in the memory that when executed by the processor further cause the network node to determine whether the TDM SCADA message has not yet been received after expiration of a predetermined time interval.

10. The network node of claim 9, wherein the program of computer readable instructions stored in the memory that when executed by the processor further cause the network node to determine whether the TDM SCADA message has not yet been received after expiration of a predetermined time interval wherein the predetermined time interval corresponds to a timeslot defined by TDM techniques employed by the SCADA equipment.

11. A network node comprising:

a serial link interface;

a packet interface; and a circuit emulation service (CES) function configured to determine whether a message received over the serial link interface is a TDM SCADA message, encapsulate, in a CES packet, the received TDM SCADA message received set a serial number of the packet to null when the received message is the TDM SCADA message, and transmit the CES packet over the packet interface.

12. The network node of claim 11, further comprising:

an activity detection function configured to detect that the TDM SCADA message has not been received over the serial link interface upon expiration of a predetermined time interval and provide an indication to that effect to the CES function, wherein the CES function is further configured to generate a filler from responsive to the indication from the activity detection function, encapsulate the filler frame into a CES packet having a null serial number, and transmit the CES packet to the packet interface.

* * * * *